United States Patent
Woenarta (10) Patent No.: US 11,391,337 B2
(45) Date of Patent: Jul. 19, 2022

(54) ADJUSTABLE VIBRATION DAMPER AND VEHICLE HAVING SUCH A VIBRATION DAMPER

(71) Applicants: ThyssenKrupp Bilstein GmbH, Ennepetal (DE); thyssenkrupp AG, Essen (DE)

(72) Inventor: Freddy Woenarta, Braunschweig (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/697,522

(22) Filed: Nov. 27, 2019

(65) Prior Publication Data

US 2020/0173513 A1    Jun. 4, 2020

(30) Foreign Application Priority Data

Nov. 29, 2018 (DE) ...................... 10 2018 220 630.9

(51) Int. Cl.
*F16F 9/34* (2006.01)
*F16F 9/06* (2006.01)
(Continued)

(52) U.S. Cl.
CPC ............. *F16F 9/064* (2013.01); *B60G 13/08* (2013.01); *B60G 17/08* (2013.01); *F16F 9/062* (2013.01);
(Continued)

(58) Field of Classification Search
CPC .. B60G 17/08; B60G 13/08; F16F 9/46; F16F 9/325; F16F 9/32; F16F 9/34
(Continued)

(56) References Cited

U.S. PATENT DOCUMENTS 5,586,627 A * 12/1996 Nezu ...................... B60G 17/08
188/266.6
5,848,677 A * 12/1998 Beck ......................... F16F 9/06
188/322.22
(Continued)

FOREIGN PATENT DOCUMENTS

CN   101070889 A   11/2007
CN   202790291 U    3/2013
(Continued)

*Primary Examiner* — Christopher P Schwartz
(74) *Attorney, Agent, or Firm* — thyssenkrupp North America, LLC (57) ABSTRACT

An adjustable vibration damper for a vehicle may include an outer tube, an intermediate tube, and an inner tube arranged coaxially. A concentric compensation chamber between the outer tube and the intermediate tube may receive a hydraulic fluid and a gas. A piston rod may include a piston disposed movably in the inner tube and dividing an interior of the inner tube into first and second working chambers. The adjustable vibration damper may also include first and second damper valves arranged on an outer wall. The first working chamber may be fluidically connected to the compensation chamber by the first damper valve for adjustment of a pressure stage, and the second working chamber may be fluidically connected to the compensation chamber by the second damper valve for adjustment of a traction stage.

20 Claims, 6 Drawing Sheets

(51) Int. Cl.
*F16F 9/32* (2006.01)
*F16F 9/43* (2006.01)
*F16F 9/44* (2006.01)
*B60G 17/08* (2006.01)
*B60G 13/08* (2006.01)

(52) U.S. Cl.
CPC .............. *F16F 9/3285* (2013.01); *F16F 9/43* (2013.01); *F16F 9/44* (2013.01); *B60G 2202/24* (2013.01); *B60G 2206/41* (2013.01); *B60G 2500/11* (2013.01); *B60G 2600/20* (2013.01); *B60G 2800/162* (2013.01); *F16F 9/3271* (2013.01); *F16F 2222/12* (2013.01); *F16F 2228/066* (2013.01); *F16F 2230/0029* (2013.01); *F16F 2230/06* (2013.01); *F16F 2230/186* (2013.01); *F16F 2230/46* (2013.01)

(58) Field of Classification Search
USPC ................... 188/315, 322.13, 322.19, 322.2
See application file for complete search history.

(56) References Cited

U.S. PATENT DOCUMENTS

| | | | | |
|---|---|---|---|---|
| 6,079,526 | A * | 6/2000 | Nezu | .......................... F16F 9/46 |
| | | | | 188/266.6 |
| 6,182,805 | B1 * | 2/2001 | Kashiwagi | .............. F16F 9/325 |
| | | | | 188/266.6 |
| 6,305,512 | B1 | 10/2001 | Heinz | |
| 6,321,888 | B1 * | 11/2001 | Reybrouck | .............. F16F 9/325 |
| | | | | 188/299.1 |
| 2001/0006135 | A1 * | 7/2001 | Sasse | .................... F16F 9/3235 |
| | | | | 188/300 |
| 2004/0262107 | A1 * | 12/2004 | Nandyal | ................. F16F 9/092 |
| | | | | 188/314 |
| 2006/0175166 | A1 | 8/2006 | Fischer | |
| 2009/0145709 | A1 | 6/2009 | Kim | |
| 2016/0223043 | A1 | 8/2016 | Hagidaira et al. | |
| 2016/0229254 | A1 | 8/2016 | Teraoka | |
| 2016/0229255 | A1 | 8/2016 | Teraoka et al. | |
| 2018/0355940 | A1 * | 12/2018 | Manger | .................... F16F 9/325 |
| 2019/0047350 | A1 | 2/2019 | Thomae et al. | |
| 2020/0173514 | A1 * | 6/2020 | Woenarta | .............. B60G 13/08 |
| 2020/0309230 | A1 * | 10/2020 | Woenarta | .................. F16F 9/34 |

FOREIGN PATENT DOCUMENTS

| | | |
|---|---|---|
| CN | 104613124 A | 5/2015 |
| CN | 105556162 A | 5/2016 |
| CN | 106090111 U | 11/2016 |
| CN | 206159345 U | 5/2017 |
| CN | 108025615 A | 5/2018 |
| DE | 34 34 877 A | 4/1986 |
| DE | 35 00 601 A | 7/1986 |
| DE | 36 09 862 A | 10/1987 |
| DE | 44 17 796 A | 12/1994 |
| DE | 195 31 794 C | 12/1996 |
| DE | 10 2005 053 394 A | 5/2006 |
| DE | 10 2012 220 156 A | 5/2014 |
| GB | 1207706 A | 10/1970 |
| WO | 2004/016967 A | 2/2004 |

\* cited by examiner

ADJUSTABLE VIBRATION DAMPER AND VEHICLE HAVING SUCH A VIBRATION DAMPER

CROSS REFERENCE TO RELATED APPLICATION

This is a U.S. Non-Provisional application that claims priority to German Patent Application No. DE 10 2018 220 630.9, filed Nov. 29, 2018, the entire contents of which are incorporated herein by reference.

FIELD

The present disclosure generally relates to vibration dampers, including adjustable vibration dampers for vehicles.

BACKGROUND

Vibration dampers, such as that disclosed in German Patent Publication No. DE3609862A1, are known. Yet known vibration dampers lack adjustability of a vibration damper characteristic curve.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure has many advantages.

The damper valves are accessible from outside (assembly/disassembly); small damper lengths are possible; the pressure stage and traction stage are adjustable independently of each other; an improved adjustment of the damper characteristic curve. Through integration of the compensation chamber annularly around the intermediate tube, a reduction in component complexity is possible. Reduced external dimensions of the vibration damper in the gas region; a smaller gas proportion in the compensation chamber; the use of standard sealing pack (single-tube damper) is possible; protection of the hydraulic components (valves, pump, etc.) from damage by released gas bubbles in the oil; simple and cost-effective production; constructively simple structure; an improved sealing of oil against gas; prevention of damaging of the separating element by high compression forces; a simple solution for the setting or adjustment of the pressure stage and traction stage; pretensioning of the hydraulic oil by gas; increased variety of variants; separation of the bypass flow for the pressure stage and of the bypass flow for the traction stage; simple solution for the separation of the bypass flow for the traction stage; simple design structure; simple connection of the bypass ducts to the damper valves on the base body; cheap and easy to produce; reduction in component complexity through component integration; variable adjustment enables adaptation of the damper characteristic curve during operation; fixed setting enables a requirement-specific adjustment of the damper characteristic curve, for instance after assembly.

The subject of the present disclosure is therefore an adjustable vibration damper, in particular a multi-tube damper, for a vehicle, comprising:
  an outer tube, at least one intermediate tube and an inner tube, which are arranged coaxially to one another;
  a concentric compensation chamber, which is configured between the outer tube and the intermediate tube, for receiving a hydraulic fluid and a gas, and
  a piston rod having a piston which is arranged movably in the inner tube and divides an interior of the inner tube into a first working chamber and a second working chamber, said vibration damper being characterized by at least one first damper valve and at least one separate second damper valve, wherein the damper valves are arranged on an outer wall, and wherein the first working chamber is fluidically connected to the compensation chamber by the first damper valve for the adjustment of the pressure stage, and the second working chamber is fluidically connected to the compensation chamber by the second damper valve for the adjustment of the traction stage.

A further subject of the present disclosure is a vehicle having at least one adjustable vibration damper.

In another example of the present disclosure, the compensation chamber is of annular configuration, in particular is formed by an annular gap.

According to another example of the present disclosure, the compensation chamber, in the gas region, is configured such that at least in some sections it is tapered in cross-section, in particular annular cross-section.

According to another example of the present disclosure, in the compensation chamber is arranged at least one separating element, which is axially displaceable and separates the damper oil from the damper gas in a fluid-tight manner.

In another example of the present disclosure, the separating element is of annular configuration.

According to another example of the present disclosure, the separating element lies with at least one sealing lip in a fluid-tight manner against the outer tube and/or against the intermediate tube.

According to another example of the present disclosure, the separating element is of elastically deformable configuration.

In another example of the present disclosure, the damper valves are respectively formed by at least one throttle valve and/or at least one throttle check valve.

According to another example of the present disclosure, the gas is introduced into the compensation chamber directly or in a compressible gas container, in particular a gas bag.

According to another example of the present disclosure, the vibration damper is characterized by a first bypass duct and a second bypass duct, wherein to the first bypass duct is assigned the first damper valve and to the second bypass duct is assigned the second damper valve.

In another example of the present disclosure, the bypass ducts, for the separate adjustment of the pressure stage and of the traction stage, are arranged separate from each other.

According to another example of the present disclosure, the second bypass duct is configured at least partially between the inner tube and the intermediate tube.

According to another example of the present disclosure, the bypass ducts run at least partially through a base body.

In another example of the present disclosure, the bypass ducts respectively comprise a bypass cross-section which is variably adjustable by the associated damper valve and/or is fixedly set.

The present disclosure is set out in greater detail below in the accompanying drawings. The various examples depict examples of how the vibration damper according to the present disclosure can be designed.

Figure 1:
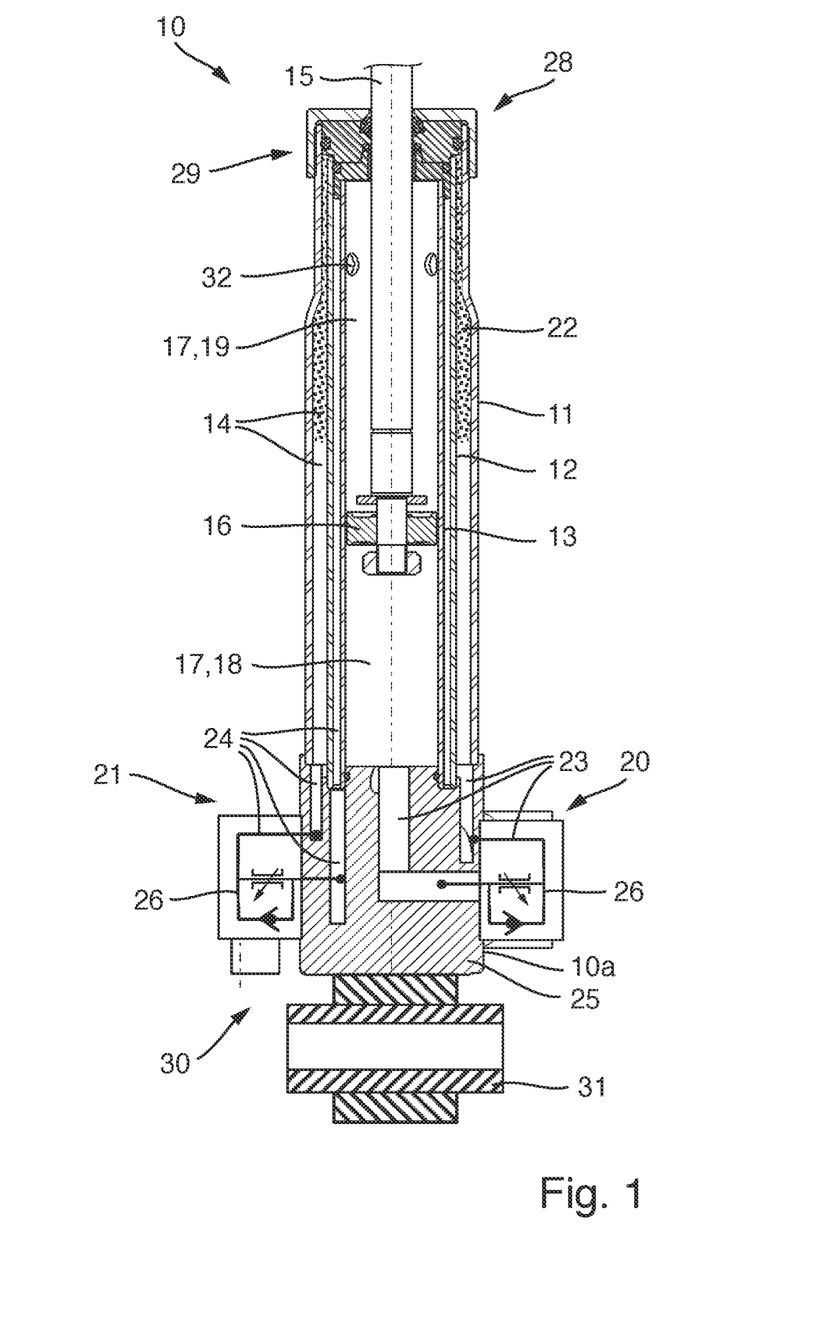
FIG. 1 is a longitudinal section view of an example twin-tube vibration damper with a damper valve arrangement for setting a compression stage and a rebound stage.

FIG. 1 shows a longitudinal section view of a vibration damper 10 with an intermediate tube 12 surrounded coaxially by an outer tube 11 and an inner tube 13 surrounded coaxially by the intermediate tube 12 with an interior space 17, a reciprocating piston rod 15 and a piston 16 arranged on the piston rod 15. The piston 16 divides the interior 17 of the inner tube 13 into a first working chamber 18 remote from the piston rod and a second working chamber 19 on the piston rod side. The ends of the outer tube 11 remote from the piston rod, the intermediate tube 12 and the inner tube 13 open into a base body 25 with an outer wall 10a. A first damper valve 20 and a second damper valve 21 are arranged on the outer wall 10a of the base body 25. On the piston rod side, the inner tube 13 has a passage 32. A balancing chamber 14 with a gas area 22 is shown between the outer tube 11 and the intermediate tube 12. The first working chamber 18 is fluid-connected via a bypass channel 23 through the first damper valve 20 to the equalizing chamber 14 via a throttle valve 26 of the first damper valve 20. The second working chamber 19 is fluid-connected via a bypass channel 24 to the equalizing chamber 14 via a throttle valve 26 of the second damper valve 21. At the ends of the outer tube 11, intermediate tube 12 and inner tube 13 a reinforcing element 29 with a reinforcing washer 28 is shown on the side facing away from the base body 25. On the side of the base body 25 facing away from the interior space 17, a connecting element 31 for connecting the vibration damper 10 is arranged on the base body 25.

Figure 2:
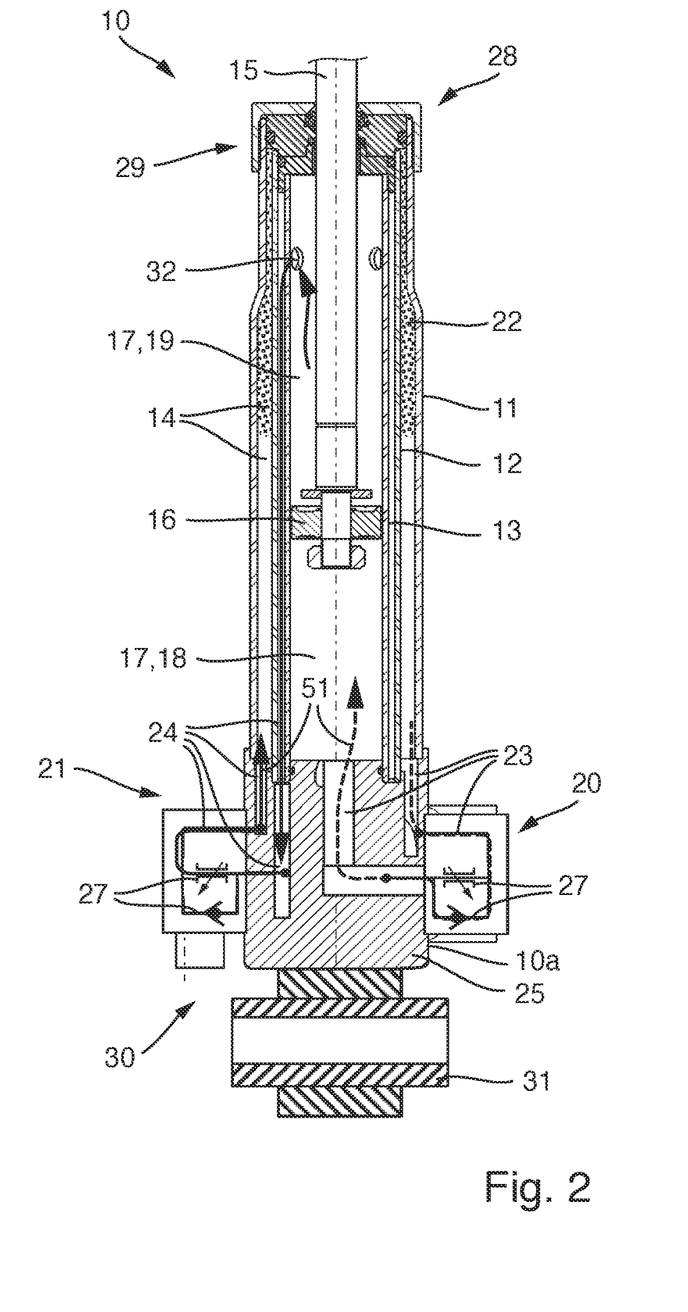
FIG. 2 is a longitudinal section view of the vibration damper of FIG. 1 with rebound impact.

FIG. 2 shows a longitudinal cross-section view of the vibration damper 10 subjected to tensile loading in accordance with FIG. 1, in which a throttle check valve 27 is additionally arranged in a fluid-connected manner parallel to the throttle valve 26 of the first damper valve 20 and parallel to the throttle valve 26 of the second damper valve 21. A dotted arrow shows the fluid flow through the first damper valve 20 for setting the pressure stage. A solid arrow represents the fluid flow through the second damper valve 21 for setting the rebound stage.

Figure 3:
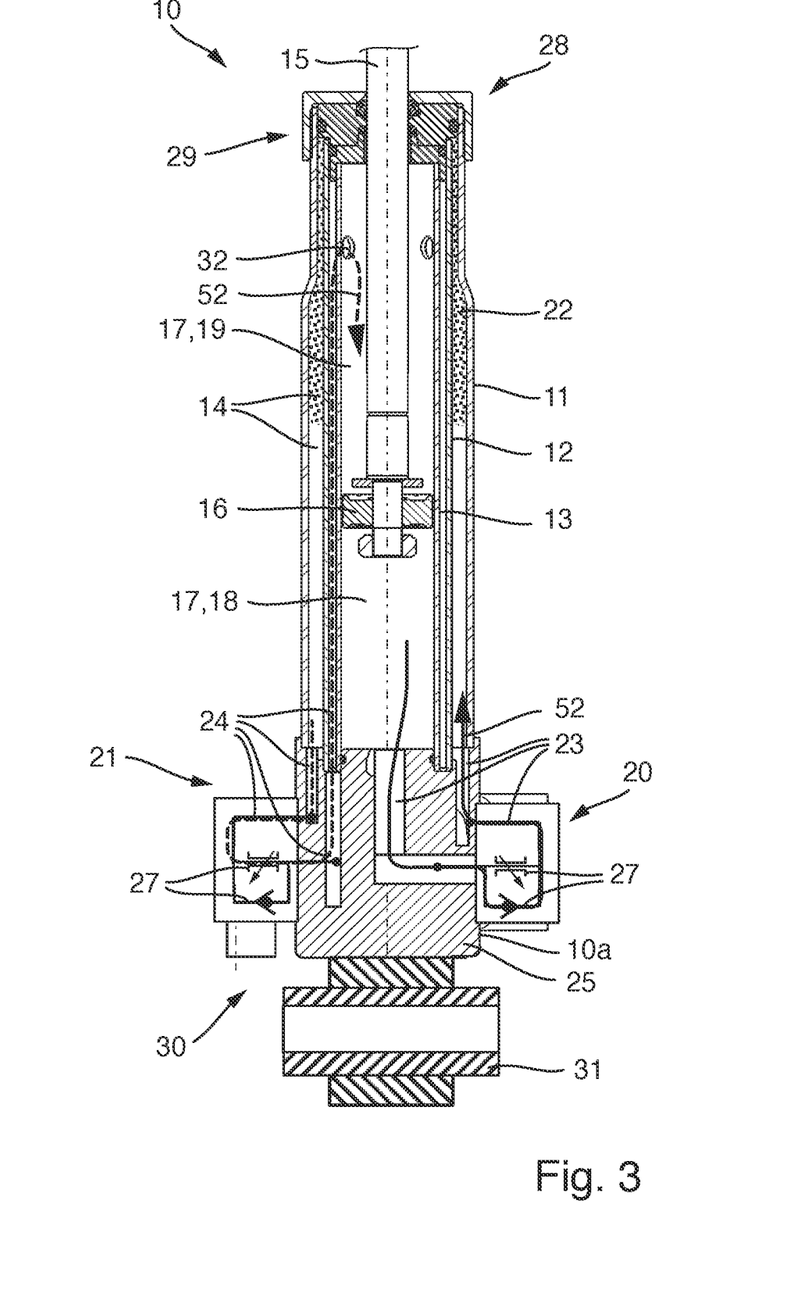
FIG. 3 is a longitudinal section view of the vibration damper of FIG. 1 when pressurized.

FIG. 3 shows a longitudinal section view of the vibration damper 10 pressurized according to FIG. 1, whereby a throttle check valve 27 is arranged parallel to the throttle valve 26 of the first damper valve 20 and parallel to the throttle valve 26 of the second damper valve 21. A solid arrow shows the fluid flow through the first damper valve 20 for setting the pressure stage. A dotted arrow shows the fluid flow through the second damper valve 21 for setting the rebound stage.

Figure 4:
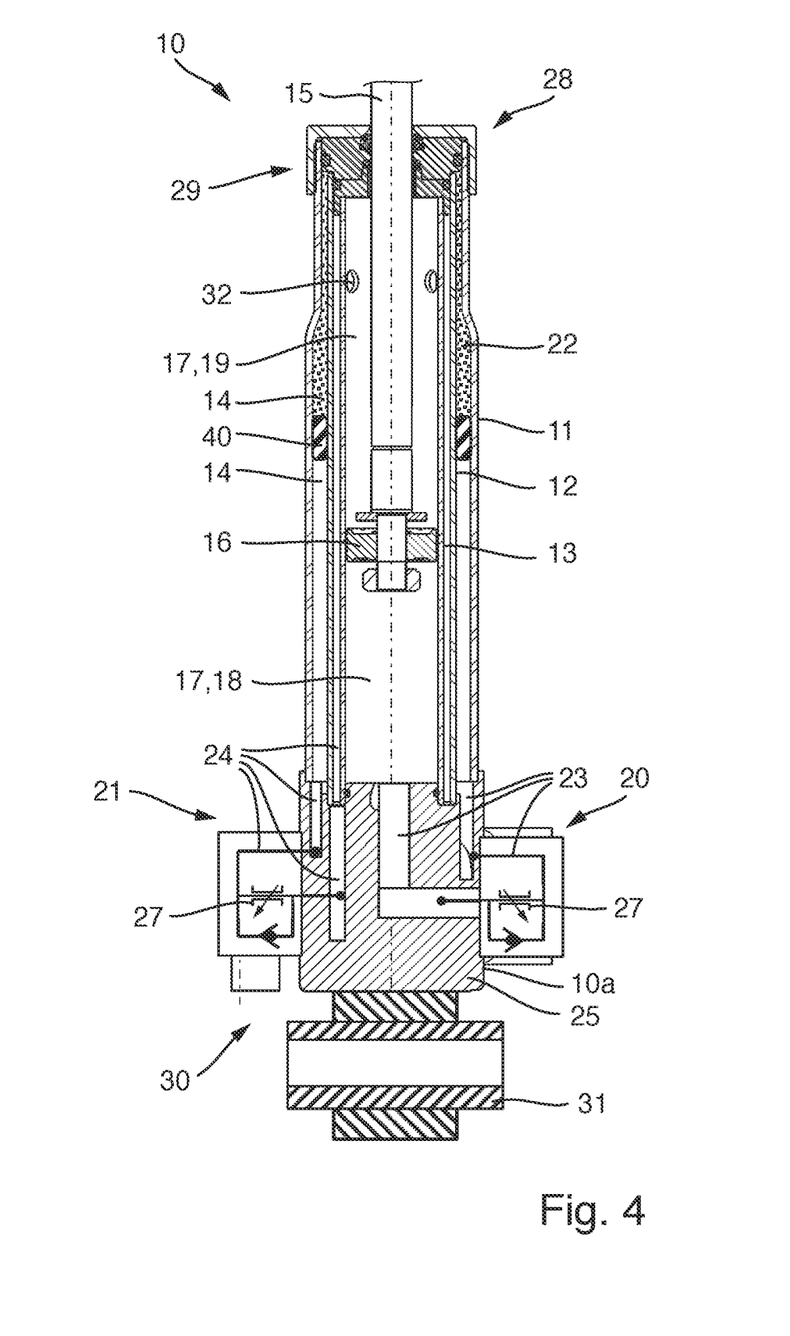
FIG. 4 is a longitudinal section view of the vibration damper of FIG. 1 with an example separating element.

FIG. 4 shows a longitudinal section view of the vibration damper according to FIG. 1 with a separating element 40 according to an invention. The separating element 40 is arranged and separates in the compensation space 14 in the area between the outer tube 11 and the intermediate tube 12. The separating element 40 can be moved axially and separates the damper oil from the damper gas, in particular the gas area 22 of the balancing chamber 14.

Figure 5:
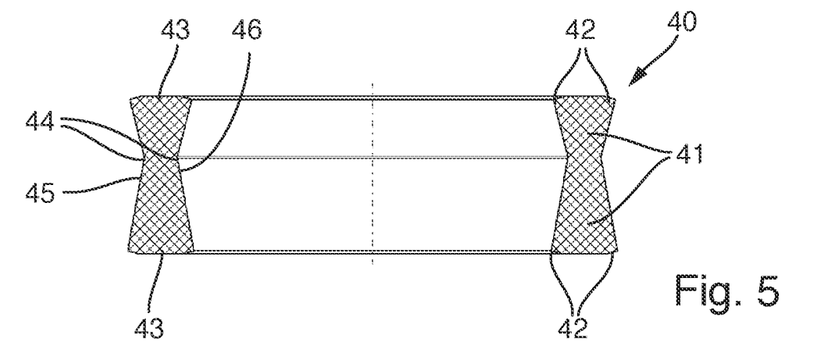
FIG. 5 is a longitudinal section view of an example separating element with converging cone segment geometries.

FIG. 5 shows a longitudinal section view of the separating element 40 according to an ingenious design with converging cone segment geometries 41.

Figure 6:
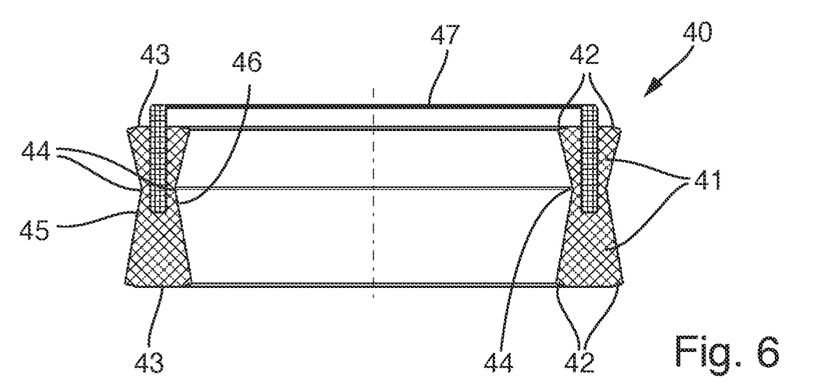
FIG. 6 is a longitudinal section view of an example separating element with converging cone segment geometries and a sealing element.

FIG. 6 shows a longitudinal section view of the separating element 40 according to a further design according to the invention with converging cone segment geometries 41 and a sealing element 47, the sealing element being recessed on one end face of the separating element.

Figure 7:
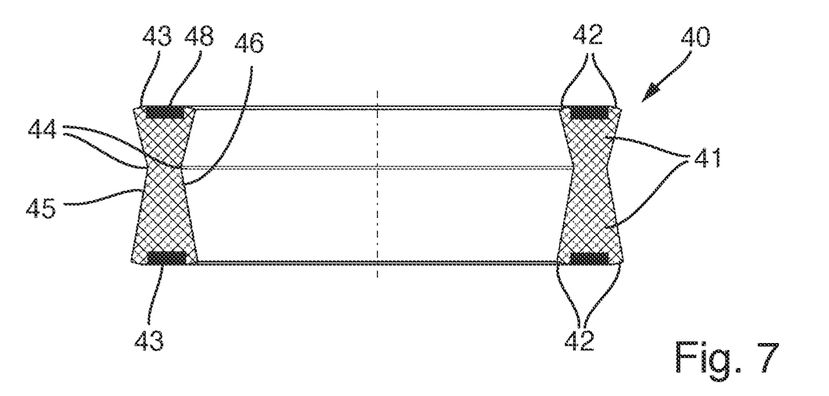
FIG. 7 is a longitudinal section view of an example separating element with cone segment geometries converging towards each other and sealing elements recessed at end faces.

FIG. 7 shows a longitudinal section view of the separating element 40 according to a further design according to the invention with cone segment geometries 41 converging towards each other and sealing elements 48 recessed at the end faces, for example with a rectangular cross-section as a flat ring shape.

Figure 8:
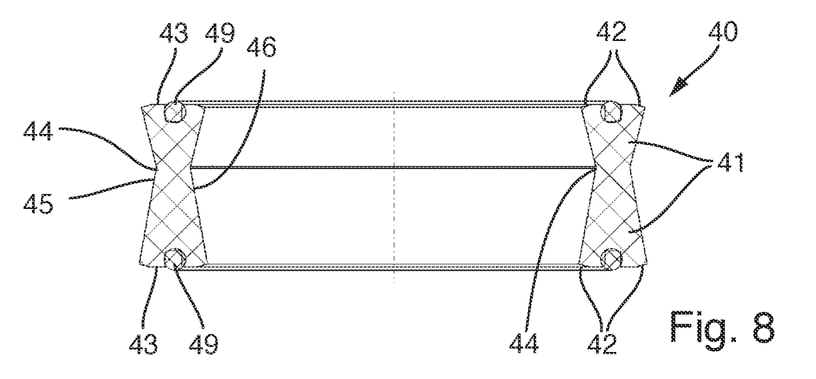
FIG. 8 is a longitudinal section view of an example separating element with conical segment geometries converging towards each other and sealing elements embedded at end faces.

FIG. 8 shows a longitudinal section view of the separating element 40 according to a further design according to the invention with conical segment geometries 41 converging towards each other and sealing elements 49 embedded at the end faces, e.g. with a circular cross-section as a round ring shape.

Figure 9:
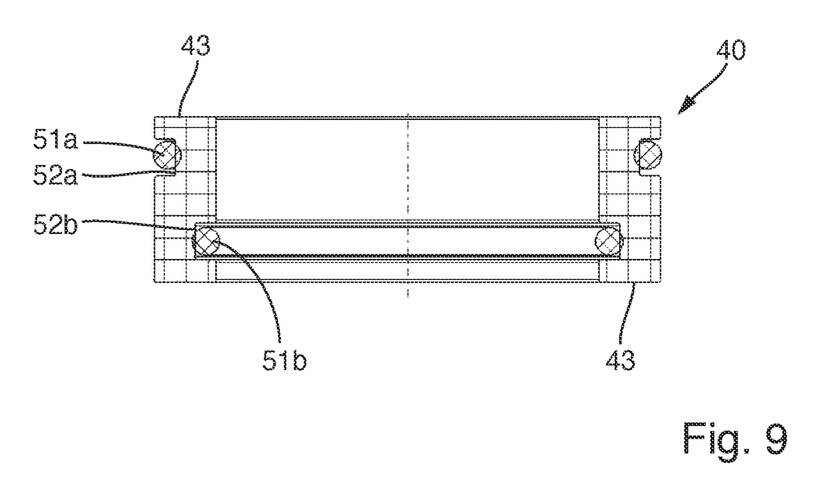
FIG. 9 is a longitudinal section view of an example separating element having rectangular geometries.

FIG. 9 shows a longitudinal section view of the separating element 40 according to a further design with rectangular geometries 41 in accordance with the invention. The separating element 40 has a circumferential outer groove 52a, in which a sealing element 51a, for example with a circular cross-section, is arranged as a circular ring shape and a circumferential inner groove 52b, in which a sealing element 51b, for example with a circular cross-section, is arranged as a circular ring shape.

REFERENCE SYMBOL LIST 10 vibration damper
10a outer wall
11 outer tube
12 intermediate tube
13 inner tube
14 compensation chamber
15 piston rod
16 piston 17 interior
18 first working chamber
19 second working chamber
20 first damper valve
21 second damper valve
22 gas region
23 bypass duct
24 bypass duct
25 base body
26 throttle valve
27 throttle check valve
28 reinforcing plate
29 reinforcing element
31a outer sealing element
31b inner sealing element
30 base valve
32a outer groove
32b inner groove
33 fastening apparatus
34 first axial end region
35 second axial end region
40 separating element
41 segment geometries
42 sealing lip
43 seal front surface
44 seal groove
45 outside groove
46 seal inside groove
47 sealing element
48 sealing element
49 sealing element
51a sealing element
51b sealing element
52a outer groove
52b inner groove

What is claimed is:

1. An adjustable vibration damper for a vehicle, the adjustable vibration damper comprising:
    an outer tube, an intermediate tube, and an inner tube that are disposed coaxially;
    a compensation chamber between the outer tube and the intermediate tube for receiving a hydraulic fluid and a gas, wherein the compensation chamber is concentric;
    a piston rod having a piston that is positioned movably in the inner tube and that divides an interior of the inner tube into a first working chamber and a second working chamber;
    a first damper valve and a second damper valve that is separate from the first damper valve, wherein the first and second damper valves are disposed on an outer wall, wherein the first working chamber is fluidically connected to the compensation chamber by the first damper valve for adjustment of a pressure stage, wherein the second working chamber is fluidically connected to the compensation chamber by the second damper valve for adjustment of a traction stage; and
    a separating element disposed between the outer tube and the intermediate tube in the compensation chamber, with the separating element being axially displaceable, wherein the separating element is annular and separates the hydraulic fluid from the gas in a fluid-tight manner.

2. The adjustable vibration damper of claim 1 comprising a first bypass duct and a second bypass duct, wherein the first damper valve is assigned to the first bypass duct, wherein the second damper valve is assigned to the second bypass duct.

3. The adjustable vibration damper of claim 2 wherein the first and second bypass ducts are disposed separate from one another for separate adjustment of the pressure stage and the traction stage.

4. The adjustable vibration damper of claim 2 wherein the second bypass duct is disposed at least partially between the inner tube and the intermediate tube.

5. The adjustable vibration damper of claim 2 wherein the first and second bypass ducts run at least partially through a base body.

6. The adjustable vibration damper of claim 2 wherein the first and second bypass ducts respectively comprise a bypass cross-section that is fixed.

7. The adjustable vibration damper of claim 2 wherein the first and second bypass ducts respectively comprise a bypass cross-section that is variably adjustable by the respective damper valve.

8. The adjustable vibration damper of claim 1 wherein a shape of a cross section of the separating element has converging cone segments.

9. The adjustable vibration damper of claim 8 comprising a sealing element that is recessed in an axial end face of the separating element.

10. The adjustable vibration damper of claim 9 wherein the sealing element extends into the separating element to at least half of an axial extent of the separating element.

11. The adjustable vibration damper of claim 9 wherein the sealing element is a first sealing element and the axial end face is a first axial end face of the separating element, wherein a second sealing element is recessed in a second axial end face of the separating element that is opposite the first axial end face.

12. The adjustable vibration damper of claim 8 comprising sealing elements with circular cross sections that are recessed in axial end faces of the separating element.

13. The adjustable vibration damper of claim 1 wherein the compensation chamber is of an annular configuration.

14. The adjustable vibration damper of claim 1 wherein at least some sections of a gas region of the compensation chamber have a tapered cross-section.

15. The adjustable vibration damper of claim 1 wherein the separating element lies with a sealing lip in a fluid-tight manner against the intermediate tube.

16. The adjustable vibration damper of claim 1 wherein the separating element is elastically deformable.

17. The adjustable vibration damper of claim 1 wherein the first and second damper valves are respectively formed by a throttle valve and/or a throttle check valve.

18. The adjustable vibration damper of claim 1 wherein the gas is configured to be introduced into the compensation chamber directly or in a compressible gas container.

19. A vehicle comprising the adjustable vibration damper of claim 1.

20. The adjustable vibration damper of claim 1 wherein a shape of a cross section of the separating element has conical segment geometries converging towards one another.

* * * * *